US008576983B2

(12) United States Patent
Baeumer et al.

(10) Patent No.: US 8,576,983 B2
(45) Date of Patent: Nov. 5, 2013

(54) X-RAY DETECTOR FOR PHASE CONTRAST IMAGING

(75) Inventors: Christian Baeumer, Hergenrath (BE); Klaus Juergen Engel, Aachen (DE); Christoph Herrmann, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 208 days.

(21) Appl. No.: 12/866,744

(22) PCT Filed: Feb. 9, 2009

(86) PCT No.: PCT/IB2009/050519
§ 371 (c)(1), (2), (4) Date: Aug. 9, 2010

(87) PCT Pub. No.: WO2009/101569
PCT Pub. Date: Aug. 20, 2009

(65) Prior Publication Data
US 2010/0322380 A1 Dec. 23, 2010

(30) Foreign Application Priority Data
Feb. 14, 2008 (EP) .................................... 08151430

(51) Int. Cl.
*G01N 23/04* (2006.01)

(52) U.S. Cl.
USPC ............................................ 378/62; 378/145

(58) Field of Classification Search
USPC ............................................... 378/62, 145, 2
See application file for complete search history.

(56) References Cited

U.S. PATENT DOCUMENTS 4,413,353 A 11/1983 Macovski et al.
4,983,828 A 1/1991 Stephens
5,812,629 A * 9/1998 Clauser ........................... 378/62
2007/0183563 A1 8/2007 Baumann et al.
2007/0183583 A1 * 8/2007 Baumann et al. ............. 378/145

FOREIGN PATENT DOCUMENTS

| | | | |
|---|---|---|---|
| CN | 1965760 | A | 5/2007 |
| CN | 101011257 | A | 8/2007 |
| CN | 101044987 | A | 10/2007 |
| EP | 1879020 | A1 | 1/2008 |
| JP | 2007203062 | A | 8/2007 |
| JP | 2007203064 | A | 8/2007 |
| JP | 2007203066 | A | 8/2007 |
| JP | 2007203074 | A | 8/2007 |
| JP | 2008289878 | A | 12/2008 |
| WO | 2004071298 | A1 | 8/2004 |

OTHER PUBLICATIONS

Llopart et al: "Medipix2: A 64-K Pixel Readout Chip With 55-um Square Elements Working in Single Photon Counting Mode"; IEEE Transactions on Nuclear Science, Vol. 49, No. 5, Oct. 2002, pp. 2279-2283.
Weitkamp et al: "X-Ray Phase Imaging With a Grating Interferometer"; Optics Express, vol. 13, No. 16, Aug. 2005, pp. 6296-6304.
Pfeiffer et al: "Hard X-Ray Phase Tomography With Low-Brilliance Sources"; Physical Review Letters, vol. 98, 2007, pp. 108105-1-108105-4.
Bech et al: "X-Ray Imaging With the Pilatus 100K Detector"; Applied Radiation and Isotopes, vol. 66, 2008, pp. 474-478.

* cited by examiner

*Primary Examiner* — Hoon Song

(57) ABSTRACT

The invention relates to an X-ray detector (30) that comprises an array of sensitive elements ($P_{i-1,b}$, $P_{ia}$, $P_{ib}$, $P_{i+1,a}$, $P_{i+1,b}$) and at least two analyzer gratings ($G_{2a}$, $G_{2b}$) disposed with different phase and/or periodicity in front of two different sensitive elements. Preferably, the sensitive elements are organized in macro-pixels ($\Pi_i$) of e.g. four adjacent sensitive elements, where analyzer gratings with mutually different phases are disposed in front said sensitive elements. The detector (30) can particularly be applied in an X-ray device (100) for generating phase contrast images because it allows to sample an intensity pattern (I) generated by such a device simultaneously at different positions.

22 Claims, 2 Drawing Sheets

X-RAY DETECTOR FOR PHASE CONTRAST IMAGING

FIELD OF THE INVENTION

The invention relates to an X-ray detector, an X-ray device comprising such a detector, and a method for analyzing an X-ray intensity pattern, particularly for generating phase contrast X-ray images of an object.

BACKGROUND OF THE INVENTION

While classical X-ray imaging measures the absorption of X-rays caused by an object, phase contrast imaging aims at the detection of the phase shift X-rays experience as they pass through an object. According to a design that has been described in the literature (T. Weitkamp et al., "X-ray phase imaging with a grating interferometer", Optics Express 13(16), 2005), a phase grating is placed behind an object to generate an interference pattern of intensity maxima and minima when the object is irradiated with (coherent) X-rays. Any phase shift in the X-ray waves that is introduced by the object causes some characteristic displacement in the interference pattern. Measuring these displacements therefore allows to reconstruct the phase shift of the object one is interested in.

A problem of the described approach is that the feasible pixel size of existing X-ray detectors is (much) larger than the distance between the maxima and minima of the interference pattern. These patterns can therefore not directly be spatially resolved. To deal with this issue, it has been proposed to use an absorption grating immediately in front of the detector pixels, thus looking only at small sub-sections of the interference pattern with the pixels of the detector. Shifting the absorption grating with respect to the pixels allows to recover the structure (i.e. the deviation from the default pattern without an object) of the interference pattern. The necessary movement of optical elements is however a nontrivial mechanical task, particularly if it has to be done fast and with high accuracy, as would be required if phase contrast imaging shall be applied in a medical environment.

In addition, bringing the grid into different positions costs time so that imaging of moving objects (e.g. the beating heart) may suffer from blurring due to motion artifacts.

SUMMARY OF THE INVENTION

Based on this background it was an object of the present invention to provide means for generating X-ray phase contrast images of an object that are particularly suited for an application in medical imaging, for example in computed tomography (CT).

This object is achieved by an X-ray detector according to claim 1, an X-ray device according to claim 5, and a method according to claim 11. Preferred embodiments are disclosed in the dependent claims.

According to its first aspect, the invention relates to an X-ray detector which may particularly (but not exclusively) be used for analyzing X-ray intensity patterns in the context of phase contrast imaging. The detector comprises the following components:

a) An array of X-ray sensitive elements, usually called "pixels". The term "array" shall denote here in the most general sense any one-, two- or three-dimensional arrangement of objects. In most cases, the array will be a one- or two-dimensional arrangement.

b) At least two analyzer gratings disposed with different phase (i.e. having a phase shift with respect to each other) and/or periodicity in front of two different sensitive elements. In this context, the term "analyzer grating" shall denote an optical component with some regular variation of its X-ray characteristics, for example its absorption coefficient or its refractive index, wherein said regularity can be described by some period of repetition.

The described X-ray detector has the advantage to allow a sampling of an X-ray (intensity) pattern impinging on it simultaneously with at least two analyzer gratings of different characteristics. As will be described in more detail below, such an X-ray detector can particularly be used for generating phase contrast X-ray images of an object without a need to move two optical elements with respect to each other.

While the invention comprises the case that only two analyzer gratings are present, it is preferred that one analyzer grating is disposed in front of each sensitive element. The analyzer gratings will in this case constitute an array corresponding to the array of sensitive elements, wherein at least two analyzer gratings of this array have different phase and/or periodicity. In general, the set of all analyzer gratings can be decomposed into subsets of analyzer gratings having among each other the same phase and periodicity, wherein each two analyzer gratings arbitrarily chosen from different subsets will have different phase and/or periodicity. In preferred embodiments, the subsets will have approximately the same number of elements, and the elements (analyzer gratings) of each subset are substantially evenly spread across the whole array of analyzer gratings. For each subset and any position on the array it will therefore be possible to find in the vicinity of said position an analyzer grating from said subset.

In a preferred embodiment of the X-ray detector, the analyzer gratings are realized as absorption grids, particularly line grids consisting of a plurality of parallel, X-ray absorbing lines repeated with some period (pitch) and including transparent stripes between them.

According to another preferred embodiment of the X-ray detector, the array of sensitive elements comprises at least one ensemble of several sensitive elements, which will be called "macro-pixel" in the following, wherein said sensitive elements have analyzer gratings in front of them that have mutually different phase and/or periodicity. Thus the sensitive elements of the macro-pixel receive X-radiation which has gone through different kinds of pre-processing, and the macro-pixel as a whole provides in parallel a plurality of sensor signals with different information content. The macro-pixel preferably constitutes a connected structure, particularly with a compact shape like that of a rectangle or circle. Moreover, it is preferred that the whole array of sensitive elements is organized in such macro-pixels, which may have different constitutions (e.g. different numbers of sensitive elements and/or differently designed analyzer gratings) or may all have the same design.

In a further development of the embodiments with macro-pixels, the analyzer gratings of a macro-pixel have the same period but mutual phase shifts that are evenly distributed over one period of the grating structure. Thus the length of one period is homogeneously sampled/processed by the analyzer gratings of the macro-pixel.

The invention further relates to an X-ray device for generating phase contrast images of an object, i.e. images in which the value of image points is related to the phase shift that is induced in transmitted X-rays by the object, while the position of image points is spatially related to the object (e.g. via a projection or sectional mapping). The X-ray device comprises the following components:

An X-ray source for generating X-rays. To allow for the generation of interference patterns, the generated X-rays should have a sufficiently large spatial and temporal coherence.

A diffractive optical element, which will be abbreviated "DOE" in the following. The DOE is exposed to the X-ray source, i.e. it is disposed such that it is hit by the emission of the X-ray source if the latter is active.

An X-ray detector of the kind described above, i.e. with an array of X-ray sensitive elements and at least two analyzer gratings disposed with different phase and/or periodicity in front of two different sensitive elements (it should be noted that the phase of the analyzer grating is another variable than the phase of the X-rays).

The described X-ray device has the advantage to process an intensity pattern that is generated by the DOE simultaneously with analyzer gratings of different characteristics. Thus the requirement of a relative movement between the DOE and a (global) analyzer grating in front of the sensitive elements can be avoided.

The periodicity of the analyzer gratings in the X-ray detector preferably corresponds to the periodicity of an interference pattern that is generated by the DOE during the use of the X-ray device at the position of the analyzer gratings. As such an interference pattern is usually related to the periodicity of the DOE, this requirement is in many cases tantamount to saying that the periodicities of the analyzer gratings and the DOE are related (e.g. identical or integer multiples of each other). As the periodicity of the analyzer grating corresponds to the periodicity of the interference pattern, said pattern can be sampled at characteristics points (e.g. at its minima, maxima, and/or any specified position in between) with sensitive elements that have a much larger extension than the period of the interference pattern.

The X-ray device preferably further comprises an evaluation unit for determining the phase shift in the X-rays caused by an object that is disposed in the path of the X-rays between the X-ray source and the DOE. The evaluation unit may optionally be realized by dedicated electronic hardware, digital data processing hardware with associated software, or a mixture of both. The evaluation unit exploits the fact that there is a well-defined relationship between the phase shift induced by an object and the resulting changes in the interference pattern that can be observed behind the DOE; inverting this relationship allows to calculate the desired phase contrast image of the object.

In a further development of the aforementioned embodiment, the evaluation unit additionally comprises a reconstruction module for reconstructing cross-sectional phase contrast images of an object from phase contrast projections of said object which were taken from different directions. The reconstruction module may apply algorithms of computed tomography (CT) which are well-known for a person skilled in the art of absorption X-ray imaging.

The X-ray detector and/or the X-ray source may optionally be mounted on some carrier in such a way that they can (circularly and/or helically) rotate with respect to a stationary object, for example a patient to be X-rayed. The X-ray detector and the X-ray source may particularly be coupled to a common carrier for a synchronous rotation. In this way a CT system as principally known can be established.

It was already mentioned that the X-ray source should have the temporal and spatial coherence that is necessary for the generation of an interference pattern behind the DOE. The X-ray source may optionally comprise a spatially extended emitter that is disposed in front of a grating, wherein the term "in front of" refers to the emission direction of the X-ray source (i.e. emitted X-rays pass through the grating). The extended emitter can be a standard anode as it is used in conventional X-ray sources and may by itself be spatially incoherent. With the help of the grating, the emitter is effectively divided in a number of line emitters each of which is spatially coherent (in a direction perpendicular to its length).

The X-ray source may optionally comprise at least one filter, e.g. a filter which suppresses a certain band of the X-ray spectrum emitted by the X-ray source. Parts of the X-ray spectrum that are of no use for the desired phase contrast imaging or that even disturb such an imaging can thus be filtered out. This helps to minimize the exposure of the object to X-radiation, which is particularly important in medical applications.

The invention further relates to a method for analyzing an X-ray intensity pattern, particularly a substantially periodical pattern, said method comprising the local sampling of the intensity pattern with at least two analyzer gratings of mutually different phase and/or period.

The method allows to process an intensity pattern locally in different ways at the same time, i.e. with analyzer gratings of different characteristics. As was described above, this is particularly advantageous in the generation of X-ray phase contrast images of an object during which said object is irradiated with X-radiation and an interference pattern is generated with a DOE disposed behind the object.

The X-ray device (or, more precisely, the associated control and evaluation units) will typically be programmable, e.g. it may include a microprocessor or an FPGA. Accordingly, the present invention further includes a computer program product which provides the functionality of any of the methods according to the present invention when executed on a computing device.

Further, the present invention includes a data carrier, for example a floppy disk, a hard disk, or a compact disc (CD-ROM), which stores the computer product in a machine readable form and which executes at least one of the methods of the invention when the program stored on the data carrier is executed on a computing device.

Nowadays, such software is often offered on the Internet or a company Intranet for download, hence the present invention also includes transmitting the computer product according to the present invention over a local or wide area network. The computing device may include a personal computer or a work station. The computing device may include one of a microprocessor and an FPGA.

BRIEF DESCRIPTION OF THE DRAWINGS

These and other aspects of the invention will be apparent from and elucidated with reference to the embodiment(s) described hereinafter. These embodiments will be described by way of example with the help of the accompanying drawings in which.

Like reference numbers in the Figures refer to identical or similar components.

DETAILED DESCRIPTION

Figure 1:
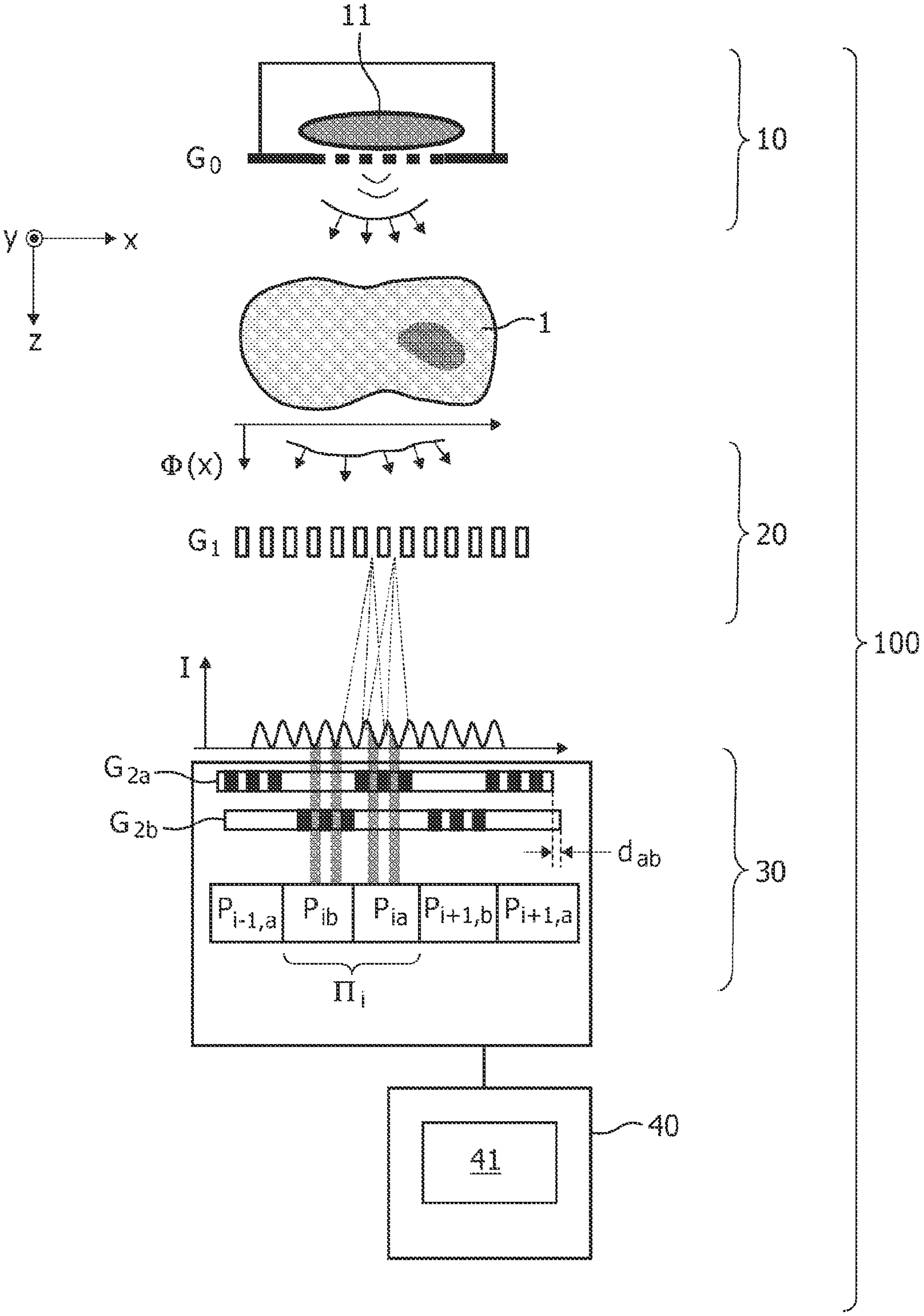
FIG. 1 schematically illustrates an X-ray device according to the present invention for generating phase contrast images of an object.

Regarding an X-ray beam as electromagnetic wave with small wavelength, the effect of matter on traversing X-rays can be described by a complex refractive index $n=1-\delta-i\beta$.

Usually, X-ray imaging refers to the imaginary part iβ of the refractive index, i.e. attenuation of the X-ray fluence by the object under investigation is considered.

However, X-ray imaging of the phase-shift δ is also possible. In fact, the effect of biological tissue on the phase shift δ is much higher than on the absorption component. This makes soft tissue imaging an attractive application of phase contrast imaging (PCI). It is also important to consider that contrast is not correlated with absorbed X-ray dose. This could make X-ray imaging a low dose modality which is especially important for X-ray CT.

For years PCI has only been studied in research activities. Then, a simple realization of PCI (to be more specific "differential PCI") has been shown which could also be employed for medical imaging (T. Weitkamp et al., above). The setup consists of a coherent X-ray source, which produces a beam that traverses an object. After the object a beam-splitter grating is placed. The resulting interference pattern, which is known as Talbot-effect, contains the required information about the beam phase shift in the relative positions of its minima and maxima (typically in the order of several μm). Since a common X-ray detector (typical resolution in the order of 150 μm) is not able to resolve such fine structures, the interference is sampled with a phase-analyzer grating (or "absorber grid") which features a periodic pattern of transmitting and absorbing strips with a periodicity similar to that of the interference pattern. The similar periodicity produces a Moiré pattern behind the grating with a much larger periodicity, which is detectable by common X-ray detectors. The term "sampling" (or "phase stepping") refers in this approach to stepping the analyzer grating by fractions of the grating pitch p (typically of the order 1 μm). The phase shift can be extracted from the particular Moiré pattern measured for each sampling grid position (e.g. 8 samples).

It is important to mention that the coherent X-ray source (microfocus-tube or Synchrotron), which seemed to be a prerequisite for PCI in the past, can be replaced by an X-ray tube and an additional source grating which assures coherence through small openings. Moreover, computed tomography of phase-shift with hard X-rays has also been described in literature (F. Pfeiffer et al., Phys. Rev. Lett. 98, 108105 (2007)).

Although the novel techniques described above mean a big leap towards PCI with small additional effort when compared to conventional X-ray imaging, the phase stepping method is regarded as major hindrance for medical applications. There are mainly two reasons:

One data point for the phase shift (of a single projection view) is calculated from several consecutive acquisition frames. Many medical applications do not allow for a prolonged acquisition time, e.g. due to heart beat or breathing of the patient.

Requirements on the mechanical alignment are quite high, since relative positions have to be fixed within a sub-micron range. This is a big challenge for tomographic imaging devices, where X-ray source and detector are mounted on a rotating gantry or C-arm. In PCI also two gratings have to be incorporated in the mechanical set-up. Further, the mechanics of the imaging device has to provide for the translational motion of the analyzer grating for the phase stepping.

FIG. 1 illustrates (not to scale!) the design of an X-ray device 100 that addresses the above issues. The X-ray device 100 comprises an X-ray source 10 for generating X-radiation. The X-ray source 10 comprises in a casing a spatially extended emitter 11 that can for example be realized by the focus (anode) of a standard X-ray source and that typically has an extension of several millimeters perpendicular to the optical axis (z-axis). A grating $G_0$ is disposed in front of the emitter 11 to subdivide the emission in lines each of which is spatially coherent in transverse (x-) direction. More details about this approach can be found in literature (e.g. Pfeiffer et al., above).

For purposes of clarity, only one cylindrical wave propagating in z-direction behind one slit of the grating $G_0$ is illustrated in the Figure. The cylindrical wave passes through an object 1, for example the body of a patient, that shall be imaged by the device 100. The material of the object 1 induces a phase shift in the X-ray wave, resulting in an altered (disturbed) wave front behind the object 1. For each position x perpendicular to the optical axis, a phase shift Φ(x) is thus associated to the wave front that is characteristic of the material properties along the corresponding X-ray path. The complete function Φ is a phase contrast projection image of the object 1 one is interested in.

In order to determine the phase shift function Φ, a diffractive optical element (DOE) is disposed behind the object 1. In the shown example, this DOE is realized by a phase grating $G_1$ extending perpendicular to the optical axis (with its slits parallel to the slits of the source grating $G_0$). The grating $G_1$ generates an interference pattern in transmission geometry, i.e. in the space opposite to the object side. This interference pattern can, at fixed coordinates y and z (and neglecting a dependence on the X-ray wavelength), be characterized by a function $$I=I(x,\Phi(x)).$$

At a given distance from the DOE grating $G_1$, the interference pattern will correspond to a periodic pattern of intensity maxima and minima as schematically illustrated in the Figure. Measuring this interference pattern with an X-ray detector 30 will then allow to infer the phase shifts Φ(x) that were introduced by the object 1.

In practice, the measurement of the interference pattern I behind the grid $G_1$ is however a nontrivial task as the required spatial resolution, determined by the distance between two adjacent maxima or minima, is much smaller than the size of the sensitive elements or pixels of usual X-ray detectors. As already explained above, it has been proposed in literature to place an absorption grating in front of the detector pixels, said grating having essentially the same periodicity as the grid $G_1$ behind the object. Such an absorption grating has the effect to provide small windows through which the detector "looks" at corresponding subsections of the periodic interference pattern I, for example at small regions around the maxima, thus effectively measuring the intensity in these subsections. By shifting the absorption grating in x-direction, the interference pattern can be sampled at several positions, which allows to reconstruct it completely. A problem of this grid-stepping approach is that it requires complicated and precise mechanics. Moreover, the stepping implies that the measurements are made sequentially at different times, which is disadvantageous if the object moves or if a rotational setup shall be used for computed tomography (CT) reconstructions.

In order to avoid these problems, it is proposed here replace the sampling in the time domain (i.e. the grid-stepping) with a sampling in the spatial domain. This can be achieved by a detector design like the one illustrated in FIG. 1. The detector 30 comprises an array of (typically several thousand) sensitive elements or pixels . . . , $P_{(i-1)a}$, $P_{(i-1)b}$, $P_{ia}$, $P_{ib}$, $P_{(i+1)a}$, $P_{(i+1)b}$, . . . which generate an electrical signal corresponding to the intensity of X-radiation impinging on them. Each of these pixels is disposed behind a corresponding local analyzer grating. For purposes of illustration, FIG. 1 shows in this respect two "global" gratings $G_{2a}$, $G_{2b}$ that are disposed parallel to each other in front of the whole array of pixels. The first grating $G_{2a}$ has absorption lines only in front of every second pixel $P_{(i-1)a}$, $P_{ia}$, $P_{(i+1)a}$, while the second grating $G_{2b}$ has absorption lines only in front of the remaining pixels $P_{(i-1)b}$, $P_{ib}$, $P_{(i+1)b}$. Moreover, the two gratings $G_{2a}$, $G_{2b}$ have the same periodicity or pitch (i.e. distance between their absorbing lines), but their line patterns are shifted with respect to each other by a distance $d_{ab}$. The pixels $P_{(i-1)a}$, $P_{ia}$, $P_{(i+1)a}$ therefore sample other relative locations of the intensity pattern I than the pixels $P_{(i-1)b}$, $P_{ib}$, $P_{(i+1)b}$. In combination, each pair [$P_{(i-1)a}$ and $P(_{(i-1)b}$], [$P_{ia}$ and $P_{ib}$], and [$P_{(i+1)a}$ and $P_{(i+1)b}$] of adjacent pixels constitutes a "macro-pixel" $\Pi_{i-1}$, $\Pi_i$, $\Pi_{i+1}$ that provides a simultaneous analysis of the local intensity pattern I at different sampling points.

Figure 2:
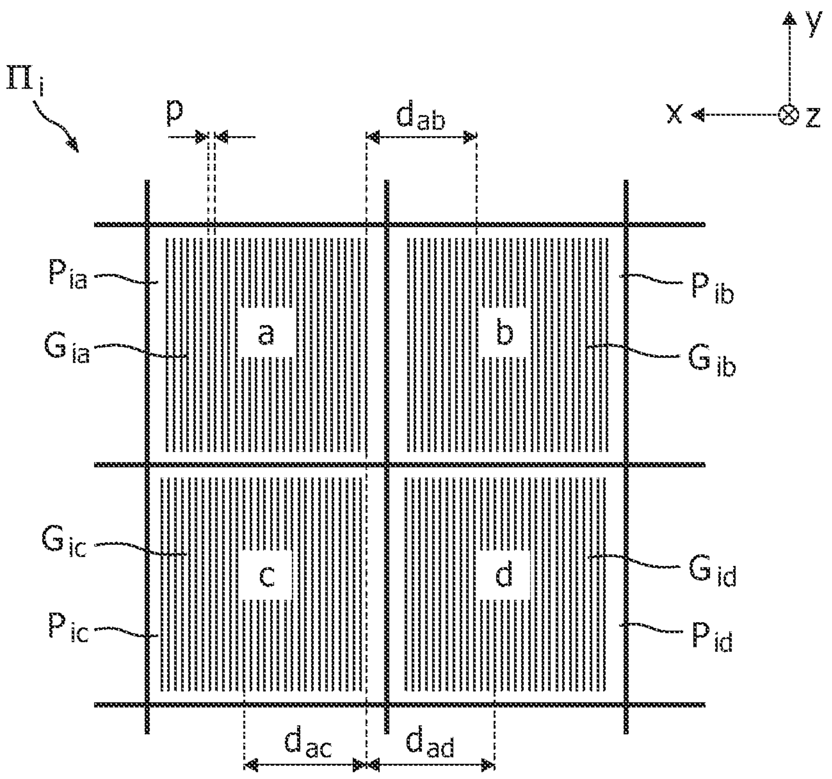
FIG. 2 shows schematically a top view on one macro-pixel of the detector of FIG. 1.

In FIG. 1, only a linear arrangement of the pixels $P_{(i-1)a}$, . . . can be seen. In general, the array of pixels will however be two-dimensional. This is illustrated in FIG. 2 in a top view onto an exemplary pixel array showing one macro-pixel $\Pi_i$ that consists of four adjacent (sub-) pixels $P_{ia}$, $P_{ib}$, $P_{ic}$, $P_{id}$. In front of each of the pixels $P_{ia}$-$P_{id}$, a corresponding analyzer grating $G_{ia}$, $G_{ib}$, $G_{ic}$, $G_{id}$ is disposed. The analyzer gratings have the same pitch p (i.e. periodicity). The line pattern of analyzer grating $G_{iY}$ is however disposed with respect to the line pattern of analyzer grating $G_{iX}$ by a nonzero distance $d_{XY}$ (with X, Y chosen from the indices a, b, c, d and with the distances being defined from the left edge of an arbitrarily chosen absorbing strip of grating $G_{iX}$ to the left edge of an arbitrarily chosen absorbing strip of the other grating $G_{iY}$). The shifts will lead to the following "effective" relative shifts with respect to grating $G_{ia}$:

$$r_{ab}=d_{ab}\ \mathrm{MOD}\ p$$

$$r_{ac}=d_{ac}\ \mathrm{MOD}\ p$$

$$r_{ad}=d_{ad}\ \mathrm{MOD}\ p,$$

where "x MOD y" refers to the modulo function, i.e. is the remainder when x is divided by y, where x, y are real numbers. $d_{ab}$, $d_{ac}$, $d_{ad}$ are chosen such that $r_{ab}$, $r_{ac}$, $r_{ad}$ are equally distributed over the pitch p, i.e. the phase sampling is equally distributed over $2\pi$.

Figure 3:
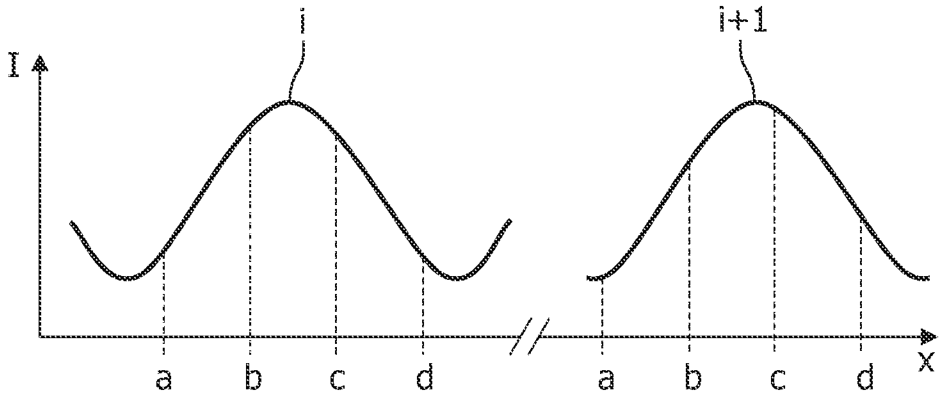
FIG. 3 illustrates the sampling of an intensity pattern with macro-pixels of the kind shown in FIG. 2.

This is illustrated in FIG. 3, which shows two exemplary periods of an intensity pattern I. The shown periods are located at different x-positions above two different macro-pixel $\Pi_i$, $\Pi_{i+1}$. As described above, these two macro-pixels each comprise four (sub-) pixels that sample four different positions a, b, c, d of the intensity pattern (it should be noted that the Figure shows only the sampling in one period of the intensity pattern, while each sub-pixel in fact samples corresponding positions in many periods). From the sampling points, the local intensity pattern I can be reconstructed for each macro-pixel as known from prior art regarding phase contrast imaging with phase-stepping, thus revealing possible (phase-)shifts in the intensity pattern I between the positions of the considered macro-pixels $\Pi_i$, $\Pi_{i+1}$. As known from the state of the art, the desired phase contrast image can finally be deduced from these (phase-)shifts in the intensity pattern.

In summary, the apparatus and method described above employ a sub-pixellation to determine the (phase-)shift of an intensity pattern. Each sub-pixel of one macro-pixel provides a different sampling of the intensity pattern. This is accomplished by a special analyzer grating which has a fixed position with respect to the pixel detector. The novel analyzer grating has the same shape as the pixel detector, i.e. it features sub-gratings. The pitch of all sub-gratings is the same as for a conventional analyzer grating. However, within the macro-pixel sub-gratings are slightly displaced with respect to each other. The offsets between sub-gratings of one macro-pixel are preferably chosen such that the corresponding sampling points of the intensity pattern cover the full shift interval of $2\pi$. The described detector can measure the shift of a projection in one shot, eliminating the need to perform consecutive steps with the absorption grid for the same projection view. Essentially, sampling in the time domain is replaced a sampling in the spatial domain.

Although the discussed examples dealt with a 2×2 macro-pixel, the design can be easily extended for a N×M pixel (N, M≥2). For instance, the sub-gratings of a macro-pixel with 3×3 sub-pixels could be designed for eight samplings as proved to be sufficient in Weitkamp et al. Thus, one sub-pixel would provide redundant information. With adequate processing it could improve the robustness of the method.

The invention can use highly segmented pixel detectors, for instance a detector based on the Medipix2 counting-mode ASIC with 55 μm wide pixels (X. Llopart et al., IEEE Trans. Nucl. Sci. 49(5), 2002, 2279-2283). Phase contrast imaging with a counting-mode detector has been reported in M. Bech et al, Applied Radiation and Isotopes (2007, doi:10.1016/j.apradiso.2007.10.003). For X-ray CT applications photon counting detectors with pixel pitches of typically 300 μm would also be suitable. Pixel pitches of conventional detectors are often small for technical reasons and sub-pixels are re-binned to larger macro-pixels in a later stage of the signal processing chain.

A 3×3 sub-pixel structure according to the present invention can e.g. be obtained with a Medipix detector of the aforementioned kind by grouping in both dimensions three pixels of 55 μm pitch to form a macro-pixel of 165 μm pitch. It should be noted that this does not correspond to 3×3 binning as it would be done in conventional applications of medical imaging in order to provide pixels of 165 μm pitch; the 55 μm sub-pixels of the macro-pixel still have to be read out independently.

Production of the analyzer grating is possible in the same way as described in prior art. For instance, a production process has been reported (T. Weitkamp et al., above) involving electron-beam lithography, deep etching into silicon and electroplating of gold. For the described invention the lithography step has to be modified, i.e. the lithography mask has to incorporate the sub-pixellation.

X-ray radiography, X-ray fluoroscopy, and X-ray CT will particularly benefit from the described invention. Compared to conventional X-ray absorption imaging, phase-contrast imaging provides images with higher contrast for soft-tissue regions.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. An X-ray detector, comprising:

an array of X-ray sensitive elements;

at least two analyzer gratings disposed with different phase and/or periodicity in front of two different sensitive elements of the array of X-ray sensitive elements, and at least one macro-pixel consisting of a plurality of sensitive elements with analyzer gratings in front of the plurality of sensitive elements, wherein the analyzer gratings have mutually different phase and/or periodicity.

2. The X-ray detector according to claim 1, wherein the analyzer gratings are absorption grids.

3. The X-ray detector according to claim 1, wherein the analyzer gratings of the macro-pixel have the same periodicity but mutual phase shifts that are evenly distributed over one period.

4. An X-ray device for generating phase contrast images of an object, comprising:

an X-ray source;

a diffractive optical element that is exposed to the X-ray source;

an X-ray detector with an array of X-ray sensitive elements and at least two analyzer gratings disposed with different phase and/or periodicity in front of two different sensitive elements, and;

a phase grating, wherein the diffractive optical element is a source grating located adjacent the x-ray source and on a first side of an object being scanned and the phase grating is located on an opposing side of the object between the object and the at least two analyzer gratings.

5. The X-ray device according to claim 4, wherein the periodicity of the analyzer gratings corresponds to the periodicity of an interference pattern generated by the DOE at the position of the analyzer gratings.

6. The X ray device according to claim 4, further comprising an evaluation unit for determining the phase shift caused by an object in X-rays on a path from the X-ray source to the X-ray detector.

7. The X ray device according to claim 6, wherein the evaluation unit comprises a reconstruction module for reconstructing a cross-sectional phase contrast slice image of an object from X-ray phase contrast projections of the object taken from different directions.

8. The X ray device according to claim 4, wherein the X-ray detector and/or the X-ray source are mounted to rotate with respect to a stationary object.

9. A method for analyzing an X-ray intensity pattern, comprising a simultaneous local sampling of an intensity pattern with analyzer gratings, wherein the analyzer gratings include at least two analyzer gratings disposed with mutually different phase and/or periodicity in front of at least one macro-pixel, consisting of a plurality of sensitive elements.

10. The X-ray detector of claim 1, wherein a first of the at least two analyzer gratings has absorbing strips that are disposed in front of a first of the two different sensitive elements and not a second of the two different sensitive elements.

11. The X-ray detector of claim 10, wherein a second of the at least two analyzer gratings has absorbing strips that are disposed in front of the second of the two different sensitive elements and not the first of the two different sensitive elements.

12. The X-ray detector of claim 1, wherein the X-ray detector includes at least four analyzer gratings, each in front of a different sensitive elements of the array of X-ray sensitive elements.

13. The X-ray detector of claim 12, wherein at least one pair of sensitive elements of the array of X-ray sensitive elements corresponds to a macro-pixel that provides simultaneous analysis of the local intensity pattern at different sampling points.

14. The X-ray device of claim 4, wherein the phase grating generates an interference pattern for radiation traversing there through.

15. The X-ray device of claim 4, wherein a first of the at least two analyzer gratings has absorbing strips that are disposed in front of a first of the two different sensitive elements and not a second of the two different sensitive elements.

16. The X-ray device of claim 15, wherein a second of the at least two analyzer gratings has absorbing strips that are disposed in front of the second of the two different sensitive elements and not the first of the two different sensitive elements.

17. The X-ray device of claim 4, wherein the X-ray detector includes at least four analyzer gratings, each in front of a different sensitive elements of the array of X-ray sensitive elements.

18. The X-ray device of claim 17, wherein at least one pair of sensitive elements of the array of X-ray sensitive elements corresponds to a macro-pixel that provides simultaneous analysis of the local intensity pattern at different sampling points.

19. An X-ray detector, comprising:

an array of X-ray sensitive elements; an at least two analyzer gratings disposed with different phase and/or periodicity in front of two different sensitive elements of the array of X-ray sensitive elements, wherein a first of the at least two analyzer gratings has absorbing strips that are disposed in front of a first of the two different sensitive elements and not a second of the two different sensitive elements.

20. An X-ray detector, comprising:

an array of X-ray sensitive elements; and at least two analyzer gratings disposed with different phase and/or periodicity in front of two different sensitive elements of the array of X-ray sensitive elements, wherein the X-ray detector includes at least four analyzer gratings, each in front of a different sensitive elements of the array of X-ray sensitive elements.

21. An X-ray device for generating phase contrast images of an object, comprising:

an X-ray source;

a diffractive optical element that is exposed to the X-ray source; and an X-ray detector with an array of X-ray sensitive elements and at least two analyzer gratings disposed with different phase and/or periodicity in front of two different sensitive elements, wherein a first of the at least two analyzer gratings has absorbing strips that are disposed in front of a first of the two different sensitive elements and not a second of the two different sensitive elements.

22. An X-ray device for generating phase contrast images of an object, comprising:

an X-ray source;

a diffractive optical element that is exposed to the X-ray source; and an X-ray detector with an array of X-ray sensitive elements and at least two analyzer gratings disposed with different phase and/or periodicity in front of two different sensitive elements, wherein the X-ray detector includes at least four analyzer gratings, each in front of a different sensitive elements of the array of X-ray sensitive elements.

* * * * *